US010721601B2

(12) United States Patent
Shi et al.

(10) Patent No.: US 10,721,601 B2
(45) Date of Patent: *Jul. 21, 2020

(54) METHOD, DEVICE, AND SYSTEM FOR OPTIMIZING SHORT MESSAGE SIGNALING

(71) Applicant: Huawei Technologies Co., Ltd., Shenzhen, Guangdong, P.R. (CN)

(72) Inventors: Shufeng Shi, Xi'an (CN); Wanqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,072

(22) Filed: Apr. 16, 2019

(65) Prior Publication Data

US 2019/0246246 A1 Aug. 8, 2019

Related U.S. Application Data

(63) Continuation of application No. 14/696,971, filed on Apr. 27, 2015, now Pat. No. 10,299,085, which is a (Continued)

(30) Foreign Application Priority Data

Oct. 26, 2012 (CN) .......................... 2012 1 0417059

(51) Int. Cl.
*H04W 4/14* (2009.01)
*H04L 12/58* (2006.01)
(Continued)

(52) U.S. Cl.
CPC ............... *H04W 4/14* (2013.01); *H04L 51/30* (2013.01); *H04L 51/34* (2013.01); *H04W 28/06* (2013.01); *H04L 51/38* (2013.01); *H04W 88/18* (2013.01)

(58) Field of Classification Search
CPC ....... H04W 4/14; H04W 28/06; H04W 88/18; H04W 51/30; H04W 51/34; H04W 51/38
See application file for complete search history.

(56) References Cited

U.S. PATENT DOCUMENTS 6,370,390 B1 4/2002 Salin et al.
2008/0305774 A1* 12/2008 Ramakrishna ....... G06Q 10/107
455/412.1
(Continued)

FOREIGN PATENT DOCUMENTS

CN 1229562 9/1999
CN 101047655 A 10/2007
(Continued)

OTHER PUBLICATIONS

Huawei, HiSilicon, "Message Waiting for Device Trigger Procedure Correction", 3GPP TSG-SA WG2 Meeting #94, Nov. 12-16, 2012, 6 pages.
(Continued)

*Primary Examiner* — George Eng
*Assistant Examiner* — Hung K Du
(74) *Attorney, Agent, or Firm* — Leydig, Voit & Mayer, Ltd.

(57) ABSTRACT

The present invention provides a method which includes: receiving a message, where the message carries a parameter indicating a validity period of a short message sent to a user or indication information indicating whether a record needs to be added to MWD of a user when a short message cannot be transmitted or fails to be transmitted; determining that the short message cannot be transmitted or the short message fails to be transmitted, and a value of the parameter is 0 or the indication information indicates that the record does not need to be added to the MWD of the user when the short message cannot be transmitted or fails to be transmitted; and skipping adding the record to the MWD of the user, where
(Continued)

the record includes an identifier of a service center for short message service serving the user. According to the method, additional signaling interaction is reduced.

20 Claims, 7 Drawing Sheets

Related U.S. Application Data continuation of application No. PCT/CN2013/085195, filed on Oct. 14, 2013.

(51) Int. Cl.
*H04W 28/06* (2009.01)
*H04W 88/18* (2009.01)

(56) References Cited

U.S. PATENT DOCUMENTS

| | | | |
|---|---|---|---|
| 2009/0111489 A1* | 4/2009 | Wilson | H04W 4/14 455/466 |
| 2009/0156208 A1* | 6/2009 | Vesterinen | H04W 48/08 455/435.1 |
| 2011/0167118 A1* | 7/2011 | Cai | H04L 51/14 709/206 |
| 2011/0170470 A1* | 7/2011 | Sinnarajah | H04L 12/189 370/312 |
| 2011/0269485 A1* | 11/2011 | Varinot | H04L 51/38 455/466 |
| 2012/0134278 A1* | 5/2012 | Li | H04L 12/66 370/244 |
| 2014/0155112 A1* | 6/2014 | Molnar | H04L 65/1016 455/466 |
| 2014/0341041 A1* | 11/2014 | Velev | H04Q 3/0045 370/236 |
| 2015/0334508 A1* | 11/2015 | Yang | H04W 4/70 455/412.1 |

FOREIGN PATENT DOCUMENTS

| | | |
|---|---|---|
| CN | 101325740 A | 12/2008 |
| CN | 102111726 A | 6/2011 |
| CN | 102131153 A | 7/2011 |
| CN | 102726072 A | 10/2012 |
| EP | 2007152 A2 | 12/2008 |
| RU | 2371885 C2 | 10/2009 |
| RU | 2447619 C2 | 4/2012 |
| WO | 2004/099919 A3 | 11/2004 |
| WO | 2011/023000 A1 | 3/2011 |

OTHER PUBLICATIONS

"Clarification on Device triggering procedure when routing information is absent", HTC, Change Request, SA WG2 #Meeting 93, Oct. 8-12, 2012, 7 pages, S2-123704.

"DT request rejection by the serving CN node", Panasonic, 3GPP TSG SA WG2 Meeting #89, Feb. 6-10, 2012, 6 pages, TD S2-120811.

"3rd Generation Partnership Partnership Project; Technical Specification Group Services and System Aspects; System improvements for Machine-Type Communications (MTC) (Release 11)", 3GPP TR 23.888 V11.0.0, Sep. 2012, 165 pages.

"Validity Time of Short Message", Huawei, 3GPP TSG CT WG4 Meeting #60, Jan. 28-Feb. 1, 2013, 7 pages, C4-130279.

"3rd Generation Partnership Partnership Project; Technical Specification Group Core Network and Terminals; Diameter based protocols to support SMS capable MMEs; (Release 11)", 3GPP TS 29.338 V1.1.0, Oct. 2012, 39 pages.

"3rd Generation Partnership Project; Technical Specification Group Services and System Aspects; Architecture enhancements to facilitate communications with packet data networks and applications (Release 11)", 3GPP TS 23.682 v11.2.0, Sep. 2012, 29 pages.

"3rd Generation Partnership Project; Technical Specification Group Core Network and Terminals; Technical realization the Short Message Service (SMS) (Release 11)", 3GPP TS 23.040 V11.3.0, Sep. 2012, 208 pages.

"3rd Generation Partnership Project; Technical Specification Group Core Network and Terminals; Mobile Application Part (MAP) specification (Release 11)", 3GPP TS 29.002 V11.4.0, Sep. 2012, 1011 pages.

\* cited by examiner

METHOD, DEVICE, AND SYSTEM FOR OPTIMIZING SHORT MESSAGE SIGNALING

CROSS-REFERENCE TO RELATED APPLICATION

This application is a continuation of U.S. patent application Ser. No. 14/696,971 filed on Apr. 27, 2015, which is a continuation of International Application No. PCT/CN2013/085195 filed on Oct. 14, 2013, which claims priority to Chinese Patent Application No. 201210417059.1 filed on Oct. 26, 2012. All of the afore-mentioned patent applications are hereby incorporated by reference in their entireties.

TECHNICAL FIELD

The present invention relates to the communications technologies field, and in particular, to a method, device, and system for optimizing short message signaling.

BACKGROUND

In a conventional short message system, when a user equipment moves between a $2^{nd}$ generation ($2^{nd}$ Generation, 2G) communications technology/$3^{rd}$ generation ($3^{rd}$ Generation, 3G) communications technology system and a Long Term Evolution (LTE, Long Term Evolution) system, the user equipment needs to perform location registration by means of a routing area update (RAU, Routing Area Update)/location area update (Location Area Update, LAU)/tracking area update (Tracking Area Update, TAU). For a mobile terminated short message (Mobile Terminated Short Message, MTSM) service, a home location register (Home Location Register, HLR)/home subscriber server (Home Subscriber Server, HSS) needs to return, according to registration information of the user equipment (user equipment, UE) in a mobile switching center (Mobile Switching Center, MSC)/visitor location register (Visitor Location Register, VLR) or a serving general packet radio service (General Packet Radio Service, GPRS) support node (Serving GPRS Support Node, SGSN) or a mobility management entity (Mobility Management Entity, MME), a correct address of a serving node to a gateway MSC for short message service (Gateway MSC For Short Message Service, SMS-GMSC), so that a short message is forwarded to the corresponding serving node and is sent to the user equipment.

A machine type communication (Machine Type Communication, MTC) application refers to network communication performed among one or more network elements or devices without human participation. Generally, the MTC application does not need voice communication, and data services are main demands of the MTC application. Currently, triggering by means of a short message is a main manner of Device Triggering in MTC. Different from the conventional short message system, two new network elements are defined in an MTC system, which are: a service capability server (Service Capability Server, SCS) and an MTC-interworking function (Machine Type Communication-InterWorking Function, MTC-IWF). The MTC-IWF may acquire, from an HSS, information (a name or an address of one or all of an MSC/VLR, an SGSN, and an MME) about a serving node that provides a short message service for a user, and send the information to a service center for short message service (Service Center for Short Message Service, SMS-SC), and then the SMS-SC sends a device triggering message to the user through the serving node.

A Validity-Period parameter indicating a validity period of a short message exists in a message for sending the short message, and indicates valid time of the short message starting from the time when the SMS-SC receives the short message, that is, time for which the SMS-SC needs to store the short message before the short message is successfully transmitted. In an MTSMS transmission process, if the short message cannot be transmitted or fails to be transmitted, the HLR/HSS adds a record to short message waiting data (Message Waiting Data, MWD) of a user, where the record includes an address of the SMS-SC serving the user. Subsequently, when the short message can be transmitted, the HLR/HSS instructs the SMS-SC to retransmit the short message to the user. However, for a short message whose value of Validity-Period is 0, the SMS-SC does not have data of the short message; therefore, even if the short message may be transmitted subsequently, the short message still cannot be retransmitted.

SUMMARY

Embodiments of the present invention provide a method, device, and system for optimizing short message signaling, to reduce additional signaling interaction caused by instructing a service center for short message service to retransmit a short message.

A first aspect of an embodiment of the present invention provides a method for optimizing short message signaling, including:

receiving a message sent by a network device, where the message carries a parameter indicating a validity period of a short message sent to a user or indication information indicating whether a record needs to be added to MWD of a user when a short message cannot be transmitted or fails to be transmitted;

determining that the short message cannot be transmitted or fails to be transmitted, and a value of the parameter is 0 or the indication information indicates that the record does not need to be added to the MWD of the user when the short message cannot be transmitted or fails to be transmitted; and skipping adding the record to the short message waiting data MWD of the user, where the record includes an identifier of a service center for short message service serving the user.

In a first possible implementation manner of the first aspect, when there is no available serving node for providing a short message service for the user, it is determined that the short message cannot be transmitted.

In a second possible implementation manner of the first aspect, when a short message fails to be transmitted because a user equipment is unreachable or a user equipment has no available storage space, it is determined that the short message fails to be transmitted.

A second aspect of an embodiment of the present invention provides a device for optimizing short message signaling, including:

a receiving unit, configured to receive a message sent by a network device, where the message carries a parameter indicating a validity period of a short message sent to a user or indication information indicating whether a record needs to be added to MWD of a user when a short message cannot be transmitted or fails to be transmitted; and a processing unit, configured to: when it is determined that the short message cannot be transmitted or fails to be transmitted, if a value of the parameter is 0 or the indication information indicates that the record does not need to be added to the MWD of the user when the short message cannot be transmitted or fails to be transmitted, skip adding the record to the short message waiting data MWD of the user, where the record includes an identifier of a service center for short message service serving the user.

In a first possible implementation manner of the second aspect, the processing unit is further configured to: when there is no available serving node for providing a short message service for the user, determine that the short message cannot be transmitted.

In a second possible implementation manner of the second aspect, the processing unit is further configured to: when a short message fails to be transmitted because a user equipment is unreachable or a user equipment has no available storage space, determine that the short message cannot be transmitted.

A third aspect of an embodiment of the present invention provides a system for optimizing short message signaling, including a first device and a second device, where the first device is configured to send a message to the second device, where the message carries a parameter indicating a validity period of a short message sent to a user or indication information indicating whether a record needs to be added to MWD of a user when a short message cannot be transmitted or fails to be transmitted; the second device is configured to: receive the message sent by the first device; when it is determined that the short message cannot be transmitted or fails to be transmitted, and if a value of the parameter is 0 or the indication information indicates that the record does not need to be added to the MWD of the user when the short message cannot be transmitted or fails to be transmitted, skip adding the record to the short message waiting data MWD of the user, where the record includes an identifier of a service center for short message service serving the user.

According to a method, device, and system for optimizing short message signaling provided in the embodiments of the present invention, a message sent by a network device is received, and the message carries a parameter indicating a validity period of a short message sent to a user or indication information indicating whether a record needs to be added to MWD of a user when a short message cannot be transmitted or fails to be transmitted; it is determined that the short message cannot be transmitted or fails to be transmitted, where a value of the parameter is 0 or the indication information indicates that the record does not need to be added to the MWD of the user when the short message cannot be transmitted or fails to be transmitted; and the record is not added to the short message waiting data MWD of the user, where the record includes an identifier of a service center for short message service serving the user. Therefore, additional signaling interaction caused by instructing a service center for short message service to retransmit a short message is reduced.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
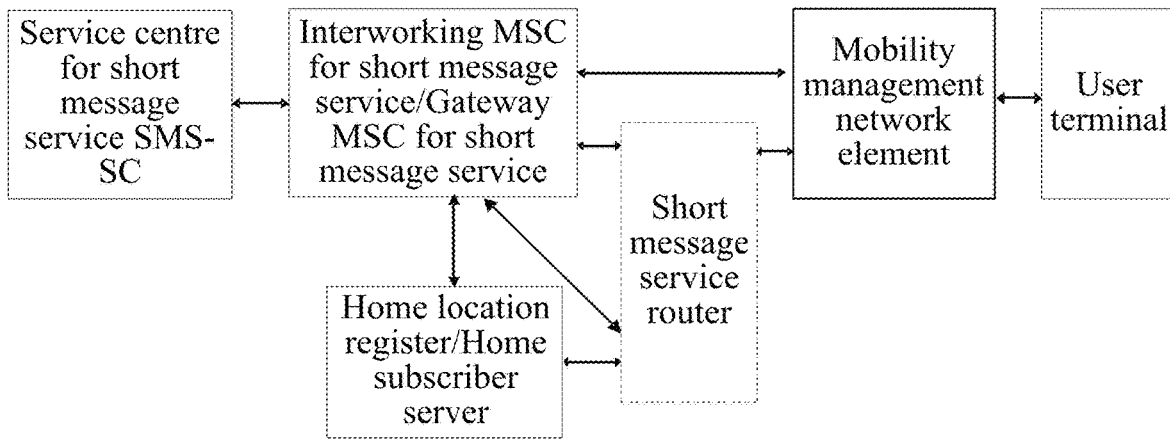
FIG. 1 is a schematic structural diagram of a conventional short message system according to an embodiment of the present invention.

FIG. 1 is a schematic structural diagram of a conventional short message system according to an embodiment of the present invention. The system includes: an SMS-SC providing short message forwarding and temporary storage functions, an interworking MSC for short message service (Interworking MSC For Short Message Service, SMS-IWMSC) providing a short message forwarding function for a mobile originated short message (Mobile Originated Short Message, MOSM), and an SMS-GMSC providing short message routing and forwarding functions for an MTSM. An HLR/HSS mainly includes user subscription data and user location information. An MSC/VLR is a serving node with which a UE registers in a circuit switched (Circuit Switched, CS) network, an SGSN is a serving node with which the UE registers in a packet switched (Packet Switched, PS) network, and an MME is a serving node with which the UE registers in an evolved packet system (Evolved Packet System, EPS) network. The MSC/VLR, the SGSN, or the MME may be collectively called a mobility management network element and provide mobility management and a service for the user, including functioning as a short message serving node to provide the short message service for the user. A short message service router (SMS Router) is an optional device.

Figure 2:
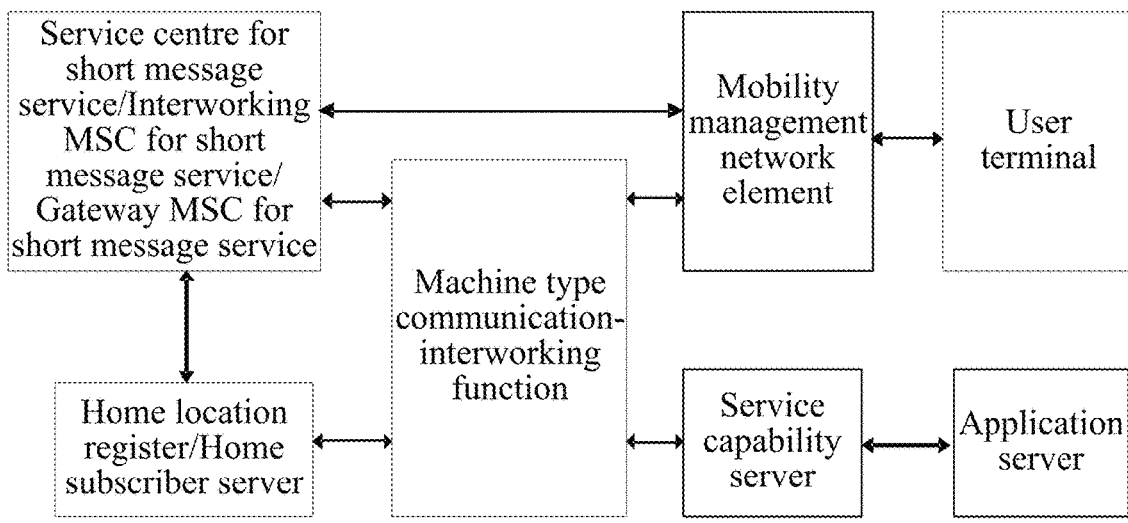
FIG. 2 is a schematic structural diagram of an MTC system according to an embodiment of the present invention.

FIG. 2 is a schematic structural diagram of an MTC system according to an embodiment of the present invention. In the MTC system, when an IP address of a user equipment is unknown or unavailable, an SCS needs to instruct, by using a device triggering (Device Triggering) mechanism, the user equipment to execute an application layer instruction, for example, to establish communication with the SCS or an AS (Application Server, application server). A mobility management network element may be an MSC/VLR, an SGSN, or an MME. Currently, triggering by means of a short message is a main manner of device triggering in MTC.

Figure 3:
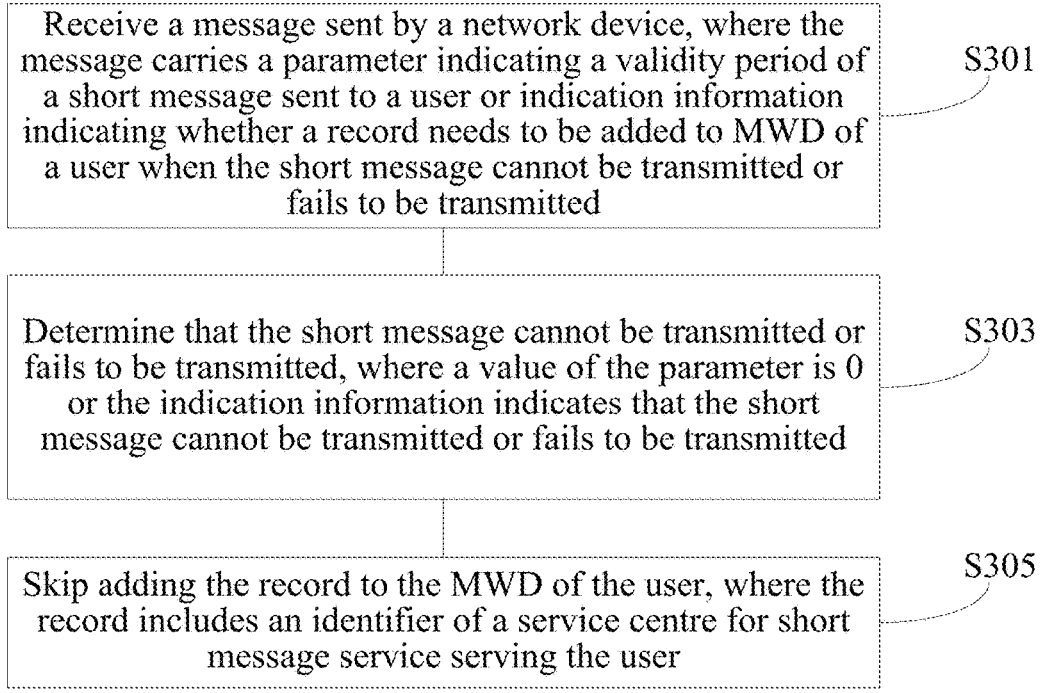
FIG. 3 is a flowchart of a method for optimizing short message signaling according to an embodiment of the present invention.

FIG. 3 is a flowchart of a method for optimizing short message signaling according to an embodiment of the present invention. The method may be applied to a conventional short message system, and may also be applied to an MTC system. The method for optimizing short message signaling includes:

S301: Receive a message sent by a network device, where the message carries a parameter indicating a validity period of a short message sent to a user or indication information indicating whether a record needs to be added to MWD of a user when a short message cannot be transmitted or fails to be transmitted.

Optionally, the parameter indicating the validity period of the short message may be Validity-Period.

S303: Determine that the transmission of the short message cannot be transmitted or fails to be transmitted, and a value of the parameter is 0 or the indication information indicates that the short message cannot be transmitted or fails to be transmitted.

Optionally, when there is no available serving node for providing a short message service for the user, it is determined that the short message cannot be transmitted.

For example, when the user does not register with any node, or when a node cannot provide a short message service for the user even though the user registers with the node, there is no available serving node for providing the short message service for the user.

Optionally, when the short message fails to be transmitted because a user equipment is unreachable or a user equipment has no available storage space, it is determined that the short message fails to be transmitted.

S305: Skip adding a record to the MWD of the user, where the record includes an identifier of a service center for short message service serving the user.

Specifically, the identifier may be a number of the service center for short message service, or may also be an address of the service center for short message service.

The skipping adding the record to the MWD of the user may also be: omitting adding the record to the MWD of the user.

Optionally, when it is determined that the short message cannot be transmitted or fails to be transmitted, and if the value of the parameter is not 0, the parameter is added to the record of the user. A timer is started, and when time indicated by the parameter is reached or exceeded, the record is deleted.

Optionally, the network device may be a gateway mobile switching center for short message service, and the message may be a short message routing request message or a short message transmission report message.

According to the method for optimizing short message signaling provided in this embodiment, for a short message of which a parameter value of a validity period of the short message is 0, after it is determined that the short message cannot be transmitted or fails to be transmitted, an identifier of an SMS-SC is not added to MWD of a user, and subsequently, it is not required to instruct the SMS-SC to retransmit the short message to a UE. Therefore, signaling to the SMS-SC is reduced, and resource overheads for managing records in MWD in the system are saved.

Figure 4:
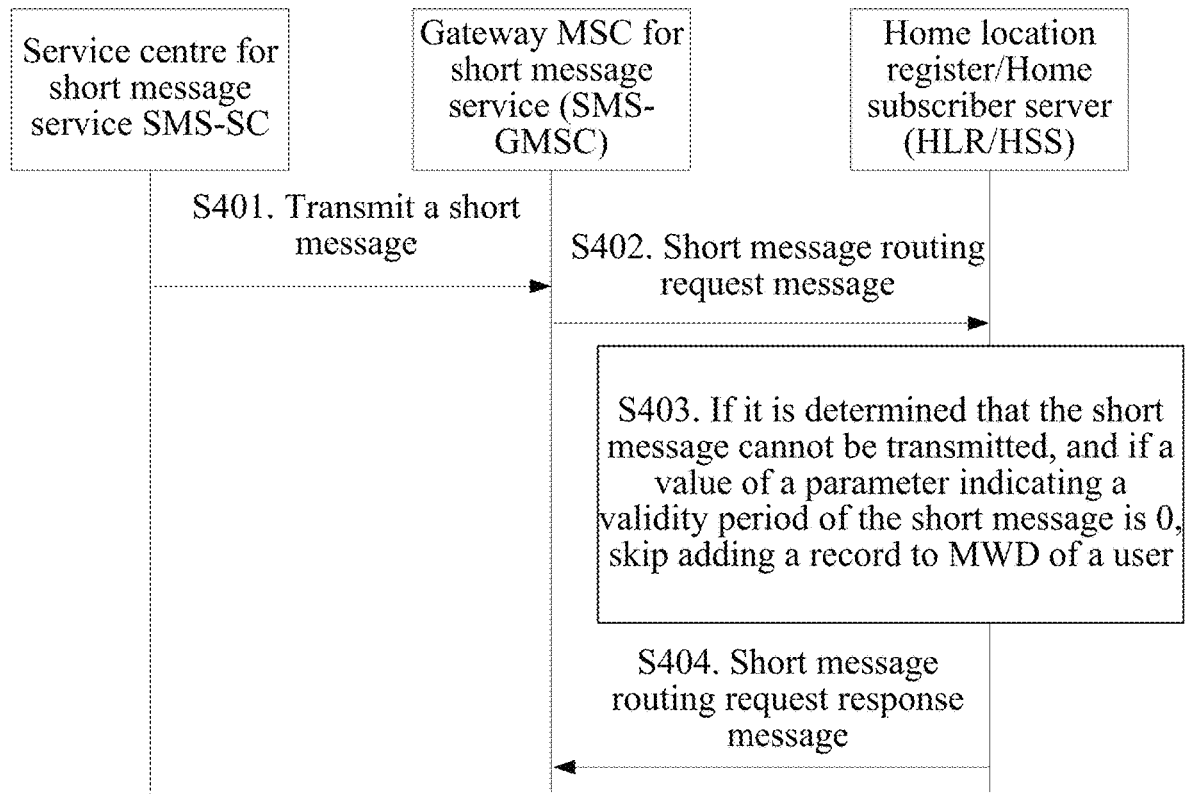
FIG. 4 is a flowchart of another method for optimizing short message signaling according to an embodiment of the present invention.

FIG. 4 is a flowchart of a method for optimizing short message signaling according to an embodiment of the present invention, and the method provided in this embodiment may be applied to a conventional short message service system.

S401: An SMS-SC transmits a short message to an SMS-GMSC.

S402: The SMS-GMSC sends a short message routing request message to an HLR/HSS, to request short message routing information.

Optionally, the short message routing request message may be a MAP_SendRoutingInfoForSM.

Optionally, when an SMS-Router exists in a network, the SMS-GMSC sends the short message routing request message to the SMS-Router, and the SMS-Router then sends the short message routing request message to the HLR/HSS to request the short message routing information.

The short message routing request message carries a parameter indicating a validity period of the short message. Certainly, the short message routing request message may also carry indication information indicating whether a record needs to be added to MWD of a user when the short message cannot be transmitted.

Optionally, the short message routing request message carries the parameter or the indication information, which may be implemented by using an extension parameter of the short message routing request message or by using an existing parameter in the short message routing request message.

In this embodiment, the short message routing request message carrying the parameter indicating the validity period of the short message is used as an example. The parameter may specifically be Validity-Period. A value of Validity-Period may be acquired by the SMS-GMSC from a received message, or may also be acquired by the SMS-GMSC from the SMS-SC, for example, a value of Validity-Period is configured on the SMS-SC.

S403: If the HLR/HSS determines that the short message cannot be transmitted, and if a value of the parameter indicating the validity period of the short message is 0, skip adding a record to the MWD of the user, where the record includes an identifier of a service center for short message service serving the user.

Specifically, the identifier may be a number of the service center for short message service, or may also be an address of the service center for short message service.

Specifically, if there is no available serving node (which may be one of an MSC/VLR, an SGSN, and an MME) providing a short message service for the user, it is determined that the short message cannot be transmitted. Generally, if the HLR/HSS records the serving node, such as the MSC/VLR, the SGSN, or the MME providing mobility management and a service for the user, and when these nodes or some of the nodes can provide the short message service, it indicates that there is an available serving node for providing the short message service for the user.

S404: The HLR/HSS returns a short message routing request response message to the SMS-GMSC. The short message routing request response message carries information indicating that there is no available serving node for providing the short message service for the user, which may be specifically indicated in this embodiment by using Absent Subscriber SMS.

Optionally, the short message routing request response message may be a MAP_SendRoutingInfoForSMS Response.

A sequence of S403 and S404 is not limited.

S405: If the SMS-GMSC fails to acquire a serving node, return a failure report to the SMS-SC.

Optionally, in S403, if the value of Validity-Period received by the HLR/HSS is not 0, the HLR/HSS adds Validity-Period to the record of the MWD of the user, starts a timer, and when time indicated by Validity-Period is reached or exceeded, deletes the record; or, when there is an available serving node for providing the short message service for the user, the HLR/HSS notifies the SMS-SC if the HLR/HSS finds that the value of the parameter is still in the validity period.

Optionally, if transmission of multiple short messages to a same user through one SMS-SC fails, a maximum Validity-Period value among the Validity-Period values which respectively correspond to the short messages is always stored in the record of the MWD corresponding to the user and the SMS-SC in the HLR/HSS.

According to the method for optimizing short message signaling provided in this embodiment, for a short message of which a parameter value of a validity period of the short message is 0, after it is determined that the short message cannot be transmitted, an identifier of an SMS-SC is not added to MWD of a user, and subsequently, it is not required to instruct the SMS-SC to retransmit the short message to a UE. Therefore, signaling to the SMS-SC is reduced, and resource overheads for managing records in MWD in the system are saved.

Figure 5:
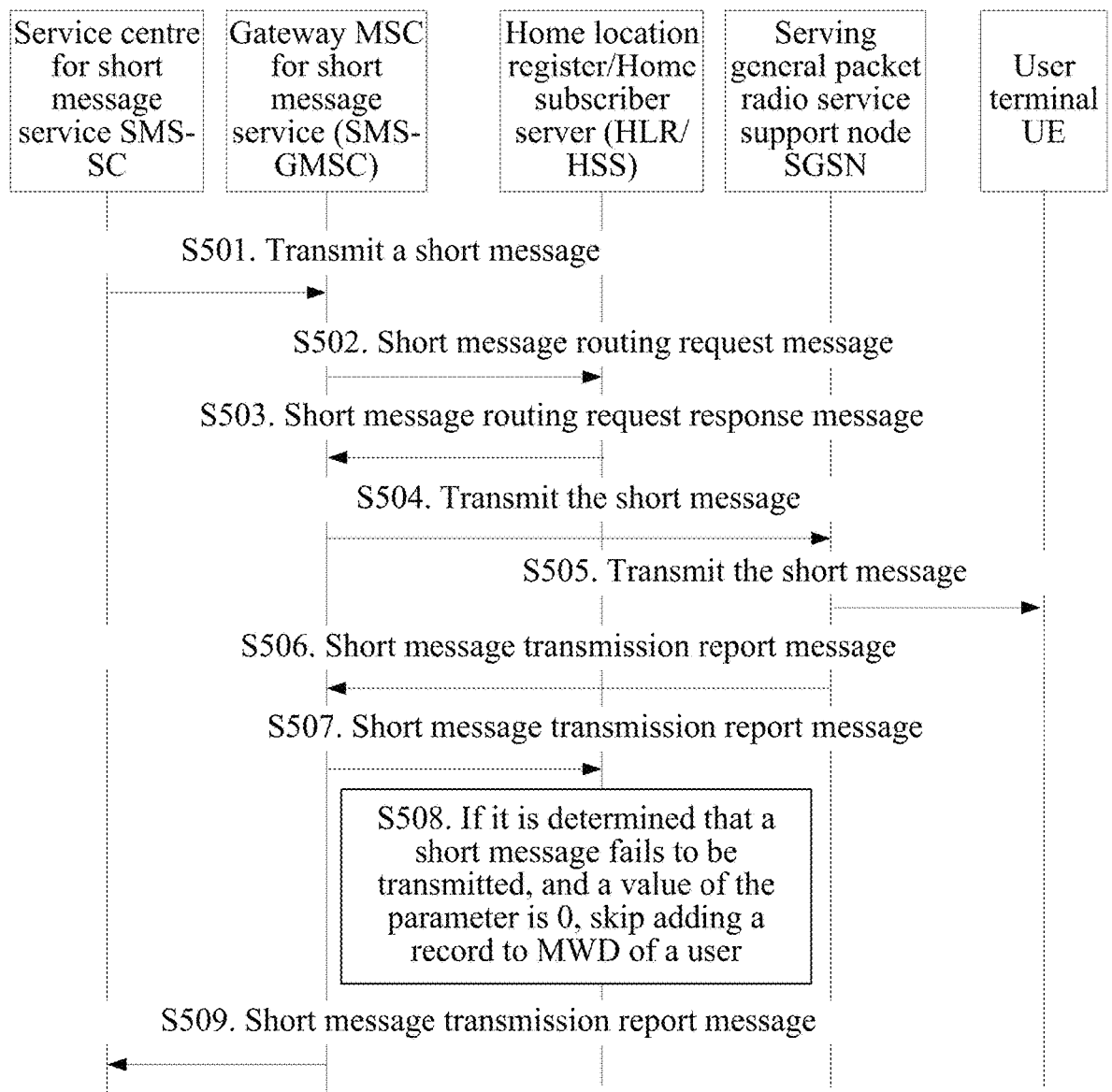
FIG. 5 is a flowchart of another method for optimizing short message signaling according to an embodiment of the present invention.

FIG. 5 is a schematic diagram of a method for optimizing short message signaling according to an embodiment of the present invention, and the method provided in this embodiment may be applied to a conventional short message service system.

S501: An SMS-SC transmits a short message to an SMS-GMSC.

S502: The SMS-GMSC sends a short message routing request message to an HLR/HSS, to request short message routing information.

Optionally, the short message routing request message may be a MAP_SendRoutingInfoForSM.

Optionally, when an SMS-Router exists in a network, the SMS-Router may send the short message routing request message to the HLR/HSS to request the short message service routing information.

S503: The HLR/HSS determines that there is an available serving node for providing a short message service for a user, and returns a short message routing request response message to the SMS-GMSC, where the short message routing request response message carries information about the serving node for providing the short message service for the user.

The carried information about the serving node for providing the short message service for the user may be a name or an address of one or all of an MSC/VLR, an SGSN, and an MME.

In this embodiment, the SGSN is used as an example.

S504: The SMS-GMSC transmits the short message to the SGSN, that is, transmits the short message to the SGSN.

S505: The SGSN then transmits the short message to a UE, that is, transmits the short message to the UE.

In this embodiment, the SGSN transmits the short message to the UE, and transmission fails.

There are various reasons that the short message fails to be transmitted, which may be that the UE is unreachable, or the UE has no available storage space (for example, the storage space of the UE overflows).

S506: The SGSN sends a short message transmission report message to the SMS-GMSC, to indicate that the short message fails to be transmitted.

S507: The SMS-GMSC sends the short message transmission report message to the HLR/HSS, and receives a response message sent by the HLR/HSS.

The short message transmission report message sent by the SMS-GMSC carries a parameter indicating a validity period of the short message. Certainly, the short message transmission report message may also carry indication information indicating whether a record needs to be added to MWD of the user when the short message fails to be transmitted.

Optionally, the short message transmission report message carries the parameter or the indication information, which may be implemented by using an extension parameter of the short message transmission report message or by using an existing parameter in the short message transmission report message.

In this embodiment, the short message that carries the parameter indicating the validity period of the short message is used as an example. The parameter may specifically be Validity-Period.

S508: If the HLR/HSS determines that the short message fails to be transmitted, and if a value of the parameter is 0, skip adding a record to the MWD of the user, where the record includes an identifier of a service center for short message service SMS-SC serving the user.

Specifically, the identifier may be a number of the service center for short message service, or may also be an address of the service center for short message service.

A sequence of S507 and S508 is not limited.

In this way, even though the UE is reachable or the UE has available storage space subsequently, the HLR/HSS does not need to instruct the SMS-SC to retransmit the short message to the UE.

S509: The SMS-GMSC sends the short message transmission report message to the SMS-SC.

Optionally, in S507, if received Validity-Period is not 0, the HLR/HSS also adds Validity-Period to the record of the MWD of the user, starts a timer, and when time indicated by Validity-Period is reached or exceeded, deletes the record; or, when the UE is reachable or the UE has available storage space, the HLR/HSS notifies the SMS-SC if the HLR/HSS finds that the parameter is still in the validity period.

Optionally, if transmission of multiple short messages to a same user through one SMS-SC fails, a maximum Validity-Period value among the Validity-Period values which respectively correspond to the short messages is always stored in the record of the MWD corresponding to the user and the SMS-SC in the HLR/HSS.

According to the method for optimizing short message signaling provided in this embodiment, for a short message of which a parameter value of a validity period of the short message is 0, after it is determined that the short message fails to be transmitted, an HLR/HSS skips adding an identifier of an SMS-SC to MWD of a user, and subsequently, it is not required to instruct the SMS-SC to retransmit the short message to a UE. Therefore, signaling to the SMS-SC is reduced, and resource overheads for managing records in MWD in the system are saved.

Figure 6:
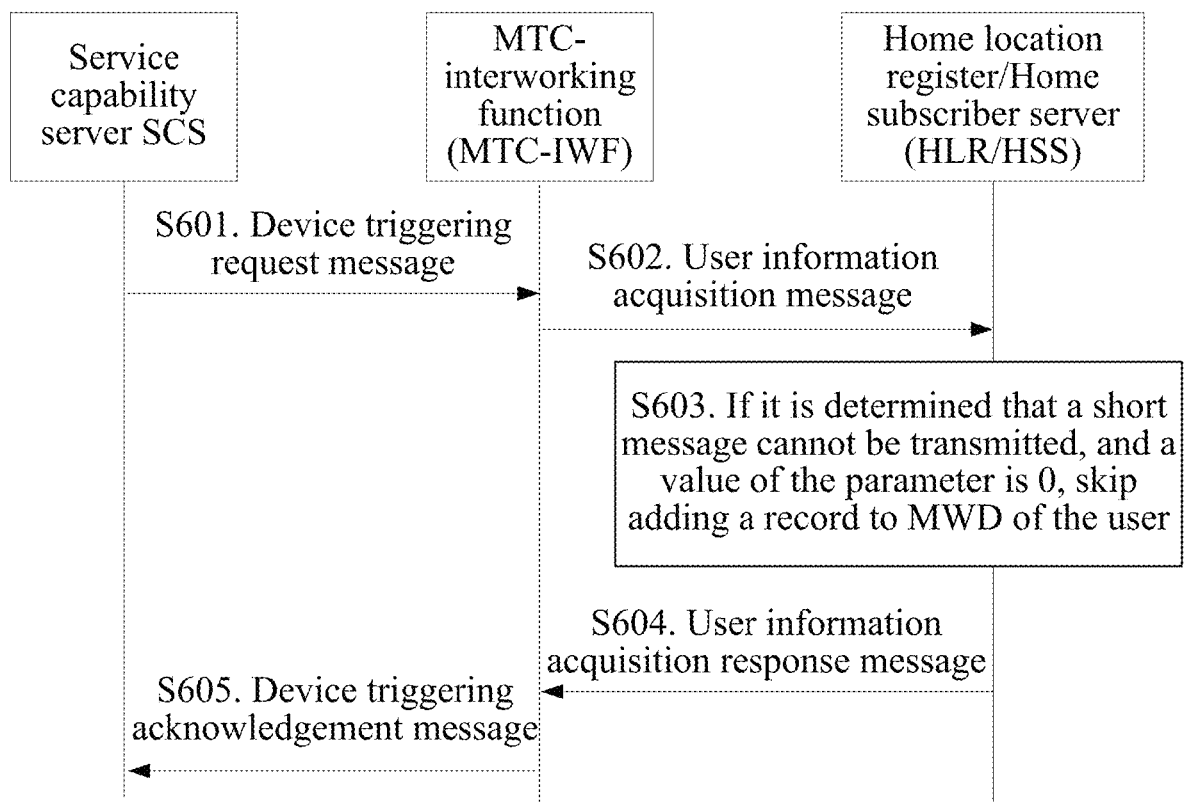
FIG. 6 is a flowchart of another method for optimizing short message signaling according to an embodiment of the present invention.

FIG. 6 is a schematic diagram of a method for optimizing short message signaling according to an embodiment of the present invention, and the method provided in this embodiment may be applied to an MTC system.

S601: An SCS sends a device triggering request message to an MTC-IWF.

S602: The MTC-IWF sends a user information acquisition message to an HLR/HSS to acquire short message routing information from the HLR/HSS while requesting completing service authorization.

The user information acquisition message carries a parameter indicating a validity period of a short message. Certainly, the user information acquisition message may also carry indication information indicating whether a record needs to be added to MWD of a user when the short message cannot be transmitted.

Optionally, the user information acquisition message carries the parameter or the indication information, which may be implemented by using an extension parameter of the user information acquisition message or by using an existing parameter in the user information acquisition message.

In this embodiment, the user information acquisition message that carries the parameter indicating the validity period of the short message is used as an example. The parameter may specifically be Validity-Period. A value of Validity-Period may be acquired by the MTC-IWF from a received message, or may also be configured on the MTC-IWF.

S603: If the HLR/HSS determines that the short message cannot be transmitted, and if a value of the parameter is 0, skip adding the record to the MWD of the user, where the record includes an identifier of a service center for short message service serving the user.

Specifically, the identifier may be a number of the service center for short message service, or may also be an address of the service center for short message service.

Specifically, if there is no available serving node (which may be one of an MSC/VLR, an SGSN, and an MME) providing a short message service for the user, it is determined that the short message cannot be transmitted. Generally, if the HLR/HSS records the serving node, such as the MSC/VLR, the SGSN, or the MME providing mobility management and a service for the user, and when these nodes or some of the nodes can provide the short message service, it indicates that there is an available serving node for providing the short message service for the user.

S604: The HLR/HSS returns a user information acquisition response message to the MTC-IWF, where the user information acquisition response message carries information indicating that there is no available serving node for providing the short message service for the UE, and may be indicated by not carrying information about any node, and may also be indicated by explicitly indicating a parameter of an "Absent Subscriber" at the same time.

A sequence of S603 and S604 is not limited.

S605: The MTC-IWF does not acquire the available serving node for providing the short message service for the user, and returns a device triggering acknowledgement message to the SCS. When determining that the value of the parameter is 0, the MTC-IWF does not transmit a short message triggering message to the service center for short message service SMS-SC, thereby also saving signaling from the MTC-IWF to the SMS-SC.

Optionally, in S603, if the value of Validity-Period received by the HLR/HSS is not 0, the HLR/HSS adds Validity-Period to the record of the MWD of the user, starts a timer, and when time indicated by Validity-Period is reached or exceeded, deletes the record; or, when there is an available serving node for providing the short message service for the user, the HLR/HSS notifies the SMS-SC only if the HLR/HSS finds that the parameter is still in the validity period.

Optionally, if transmission of multiple short messages to a same user through one SMS-SC fails, a maximum Validity-Period value among the Validity-Period values which respectively correspond to the short messages is always stored in the record of the MWD corresponding to the user and the SMS-SC in the HLR/HSS.

According to the method for optimizing short message signaling provided in this embodiment, for a short message of which a parameter value of a validity period of the short message is 0, after it is determined that the short message cannot be transmitted, an identifier of an SMS-SC is not added to MWD of a user, and subsequently, it is not required to instruct the SMS-SC to retransmit the short message to a UE. Therefore, signaling to the SMS-SC is reduced, and resource overheads for managing records in MWD in the system are saved.

Figure 7:
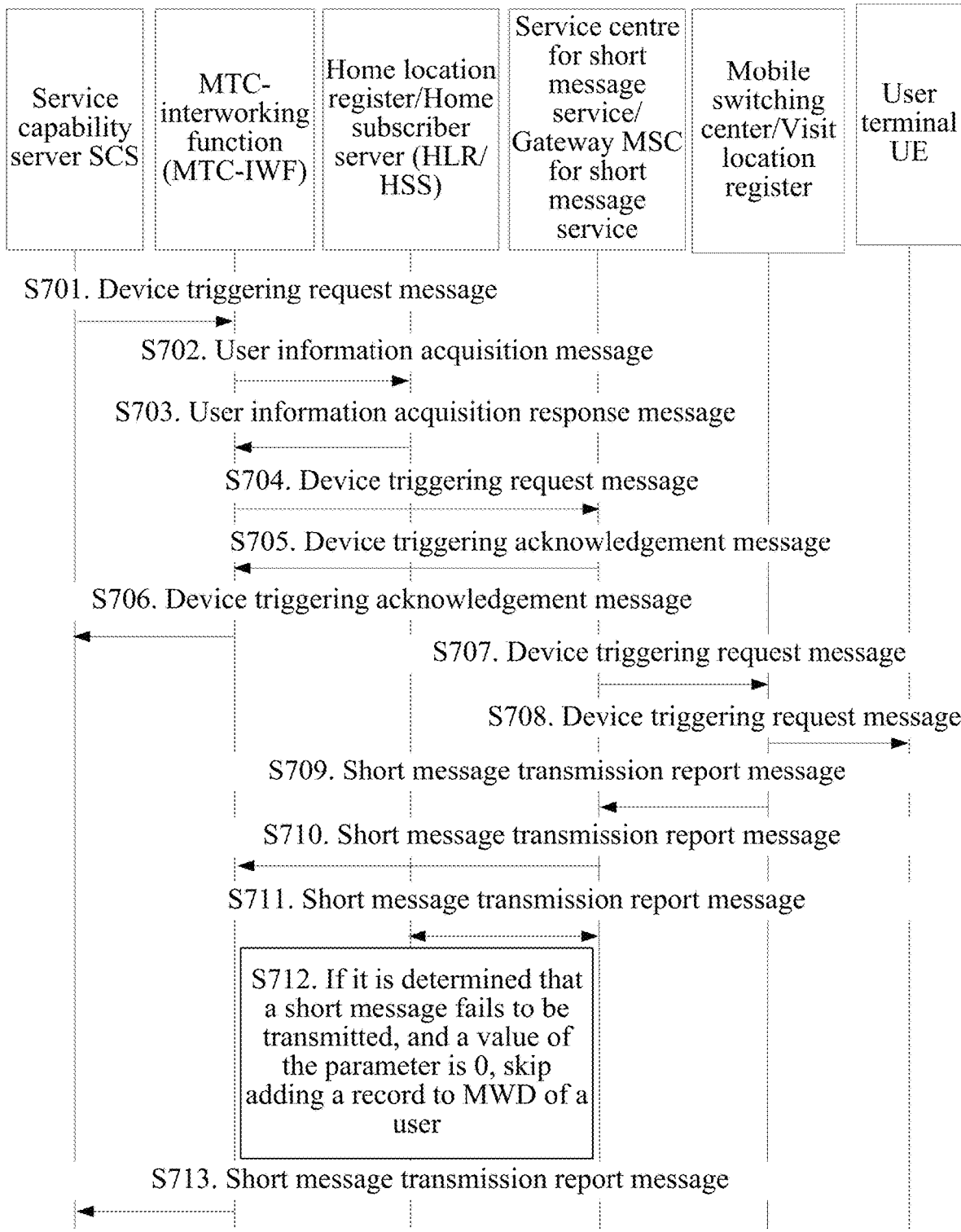
FIG. 7 is a flowchart of another method for optimizing short message signaling according to an embodiment of the present invention.

FIG. 7 is a schematic diagram of a method for optimizing short message signaling according to an embodiment of the present invention, and the method provided in this embodiment may be applied to an MTC system.

S701: An SCS sends a device triggering request message to an MTC-IWF.

S702: The MTC-IWF sends a user information acquisition message to an HLR/HSS to acquire short message routing information from the HLR/HSS while requesting completing service authorization.

S703: After the service authorization is passed, the HLR/HSS returns a user information acquisition response message to the MTC-IWF, where the user information acquisition response message carries information about a serving node for providing a short message service for a user. The information about the serving node for providing the short message service for the user may be a name or an address of one or all of an MSC/VLR, an SGSN, and an MME.

In this embodiment, the MSC/VLR is used as an example.

S704: The MTC-IWF sends the device triggering request message to an SMS-SC, where the device triggering request message carries information, which is returned by the HLR/HSS, about the serving node for providing the short message service for the user.

S705: The SMS-SC returns a device triggering acknowledgement message to the MTC-IWF.

S706: The MTC-IWF returns the device triggering acknowledgement message to the SCS.

S707: The SMS-SC transmits the device triggering request message to a serving node received from the MTC-IWF, where the serving node is the MSC/VLR.

S708: The MSC/VLR transmits the device triggering request message to a UE.

S709: The MSC/VLR sends a short message transmission report message to an SMS-GMSC, to indicate that a short message fails to be transmitted.

S710: The SMS-GMSC sends the short message transmission report message to the MTC-IWF.

S711: The SMS-GMSC sends the short message transmission report message to the HLR/HSS, and receives a response message sent by the HLR/HSS.

The short message transmission report message may be a MAP_ReportSMDeliveryStatus or a corresponding Diameter message.

The short message transmission report message sent by the SMS-GMSC carries a parameter indicating a validity period of the short message. Certainly, the short message transmission report message may also carry indication information indicating whether a record needs to be added to MWD of the user when the short message fails to be transmitted.

Optionally, the short message transmission report message carries the parameter or the indication information, which may be implemented by using an extension parameter for acquiring the short message transmission report message or by using an existing parameter in the short message transmission report message.

In this embodiment, the short message transmission report message carrying the parameter indicating the validity period of the short message is used as an example. The parameter may specifically be Validity-Period.

S712: If the HLR/HSS determines that the short message fails to be transmitted, and if a value of the parameter is 0, skip adding the record to the MWD of the user, where the record includes an identifier of the service center for short message service SMS-SC serving the user.

Specifically, the identifier may be a number of the service center for short message service, or may also be an address of the service center for short message service.

In this way, even though the UE is reachable or the UE has available storage space subsequently, the HLR/HSS does not need to instruct the SMS-SC to retransmit the short message to the UE.

S713: The MTC-IWF sends the short message transmission report message to the SCS.

Optionally, in S711, if received Validity-Period is not 0, the HLR/HSS also adds Validity-Period to the record of the MWD of the user, starts a timer, and when time indicated by Validity-Period is reached or exceeded, deletes the record; or, when the UE is reachable or the UE has available storage space, the HLR/HSS notifies the SMS-SC only if the HLR/HSS finds that the parameter is still in the validity period.

Optionally, if transmission of multiple short messages to a same UE through one SMS-SC fails, a maximum Validity-Period value among the Validity-Period values which respectively correspond to the short messages is always stored in the record of the MWD corresponding to the user and the SMS-SC in the HLR/HSS.

According to the method for optimizing short message signaling provided in this embodiment, for a short message of which a parameter value of a validity period of the short message is 0, after it is determined that the short message fails to be transmitted, an HLR/HSS skips adding an identifier of an SMS-SC to MWD of a user, and subsequently, it is not required to instruct the SMS-SC to retransmit the short message to a UE. Therefore, signaling to the SMS-SC is reduced, and resource overheads for managing records in MWD in the system are saved.

Figure 8:
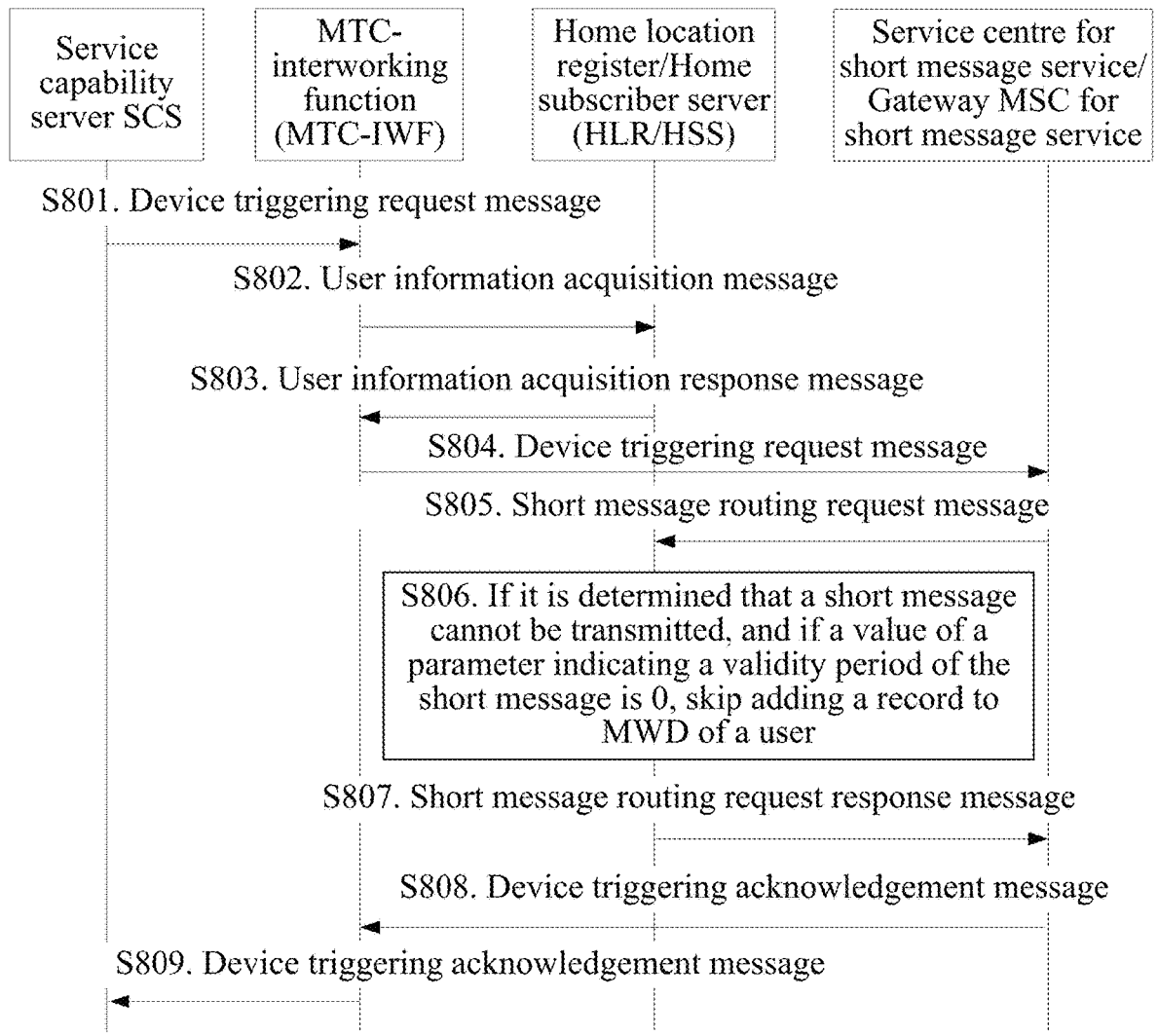
FIG. 8 is a flowchart of another method for optimizing short message signaling according to an embodiment of the present invention.

FIG. 8 is a schematic diagram of a method for optimizing short message signaling according to an embodiment of the present invention, and the method provided in this embodiment may be applied to an MTC system.

S801: An SCS sends a device triggering request message to an MTC-IWF.

S802: The MTC-IWF sends a user information acquisition message to an HLR/HSS to acquire short message routing information from the HLR/HSS while requesting completing service authorization.

S803: After the service authorization is passed, the HLR/HSS returns a user information acquisition response message to the MTC-IWF, where the user information acquisition response message carries information about a serving node for providing a short message service for a user. The information about the serving node for providing the short message service for the user may be a name or an address of one or all of an MSC/VLR, an SGSN, and an MME.

In this embodiment, the MSC/VLR is used as an example.

S804: The MTC-IWF sends the device triggering request message to an SMS-SC, where the device triggering request message carries information, which is returned by the HLR/HSS, about the serving node for providing the short message service for the user.

S805: An SMS-GMSC sends a short message routing request message to the HLR/HSS, to request short message routing information.

Optionally, the short message routing request message may be a MAP_SendRoutingInfoForSM.

Optionally, when an SMS-Router exists in a network, the SMS-GMSC sends the short message routing request message to the SMS-Router, and the SMS-Router then sends the short message routing request message to the HLR/HSS to request the short message routing information.

The short message routing request message carries a parameter indicating a validity period of the short message. Certainly, the short message routing request message may also carry indication information indicating whether a record needs to be added to MWD of the user when the short message cannot be transmitted.

Optionally, the short message routing request message carries the parameter or the indication information, which may be implemented by using an extension parameter of the short message routing request message or by using an existing parameter in the short message routing request message.

In this embodiment, the short message routing request message carrying the parameter indicating the validity period of the short message is used as an example. The parameter may specifically be Validity-Period. A value of Validity-Period may be acquired by the SMS-GMSC from a received message, or may also be acquired by the SMS-GMSC from the SMS-SC, for example, a value of Validity-Period is configured on the SMS-SC.

S806: If the HLR/HSS determines that the short message cannot be transmitted, and if a value of the parameter indicating the validity period of the short message is 0, skip adding the record to the MWD of the user, where the record includes an identifier of a service center for short message service serving the user.

Specifically, the identifier may be a number of the service center for short message service, or may also be an address of the service center for short message service.

Specifically, if there is no available serving node (which may be one of an MSC/VLR, an SGSN, and an MME) providing a short message service for the user, it is determined that the short message cannot be transmitted. Generally, if the HLR/HSS records the serving node, such as the MSC/VLR, the SGSN, or the MME providing mobility management and a service for the user, and when these nodes or some of the nodes can provide the short message service, it indicates that there is an available serving node for providing the short message service for the user.

S807: The HLR/HSS returns a short message routing request response message to the SMS-GMSC. The short message routing request response message carries information indicating that there is no available serving node for providing the short message service for the user, which may be specifically indicated in this embodiment by using Absent Subscriber SMS.

Optionally, the short message routing request response message may be a MAP_SendRoutingInfoForSMS Response.

A sequence of S806 and S807 is not limited.

S808: The SMS-SC returns a device triggering acknowledgement message to the MTC-IWF.

S809: The MTC-IWF returns the device triggering acknowledgement message to the SCS.

According to the method for optimizing short message signaling provided in this embodiment, for a short message of which a parameter value of a validity period of the short message is 0, after it is determined that the short message cannot be transmitted, an identifier of an SMS-SC is not added to MWD of a user, and subsequently, it is not required to instruct the SMS-SC to retransmit the short message to a UE. Therefore, signaling to the SMS-SC is reduced, and resource overheads for managing records in MWD in the system are saved.

Figure 9:
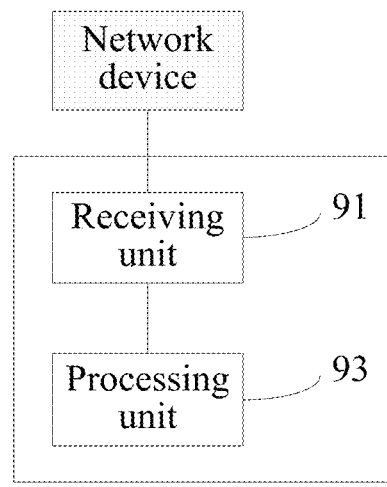
FIG. 9 is a structural diagram of a device for optimizing short message signaling according to an embodiment of the present invention.

FIG. 9 is a structural diagram of a device for optimizing short message signaling according to an embodiment of the present invention. The device includes:

a receiving unit 91, configured to receive a message sent by a network device, where the message carries a parameter indicating a validity period of a short message sent to a user or indication information indicating whether a record needs to be added to MWD of a user when a short message cannot be transmitted or fails to be transmitted; and a processing unit 93, configured to: when it is determined that the short message cannot be transmitted or fails to be transmitted, and if a value of the parameter is 0 or the indication information indicates that a record does not need to be added to the MWD of the user when the short message cannot be transmitted or fails to be transmitted, skip adding the record to the short message waiting data MWD of the user, where the record includes an identifier of a service center for short message service serving the user.

Optionally, the processing unit 93 is further configured to: when there is no available serving node for providing the short message for the user, determine that the short message cannot be transmitted.

Optionally, the processing unit 93 is further configured to: when a short message fails to be transmitted because a user equipment is unreachable or a user equipment has no available storage space, determine that the short message cannot be transmitted.

Optionally, the network device may be a gateway mobile switching center for short message service, and the message is a short message routing request message or a short message transmission report message.

Optionally, the device for optimizing short message signaling may be an HLR, or may also be an HSS, and is certainly not limited thereto.

For processing in the device for optimizing short message signaling, and interaction with another device, reference may be made to description in the method embodiments, which are not described herein again.

According to the device for optimizing short message signaling provided in this embodiment, for a short message of which a parameter value of a validity period of the short message is 0, after it is determined that the short message fails to be transmitted, the device for optimizing short message signaling skips adding an identifier of an SMS-SC to MWD of a user, and subsequently, the device for optimizing short message signaling also does not need to instruct the SMS-SC to retransmit the short message to a UE. Therefore, signaling from the device for optimizing short message signaling to the SMS-SC is reduced, and resource overheads for managing records in MWD in the system are saved.

Figure 10:
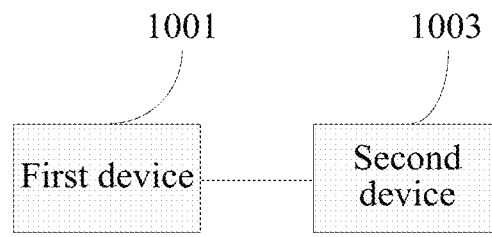
FIG. 10 is a schematic diagram of a system for optimizing short message signaling according to an embodiment of the present invention.

FIG. 10 is a schematic diagram of a system for optimizing short message signaling according to an embodiment of the present invention. The system includes a first device 1001 and a second device 1003.

The first device 1001 is configured to send a message to the second device 1003, where the message carries a parameter indicating a validity period of a short message sent to a user or indication information indicating whether a record needs to be added to MWD of a user when a short message cannot be transmitted or fails to be transmitted.

The second device 1003 is configured to receive the message sent by the first device; and when it is determined that the short message cannot be transmitted or fails to be transmitted, and if a value of the parameter is 0 or the indication information indicates that the record does not need to be added to the MWD of the user when the short message cannot be transmitted or fails to be transmitted, skip adding the record to the short message waiting data MWD of the user, where the record includes an identifier of a service center for short message service serving the user.

Optionally, the second device 1003 may be the device for optimizing short message signaling shown in FIG. 9, which is not described herein again.

The device for optimizing short message signaling may be an HLR, or may also be an HSS, and is certainly not limited thereto.

Optionally, the first device 1001 is a gateway mobile switching center for short message service, and the message sent by the first device 1001 to the second device 1003 is a short message routing request message or a short message transmission report message.

In the system for optimizing short message signaling, for interaction between the first device and the second device, reference may be made to description in the method embodiments, which are not described herein again.

According to the system for optimizing short message signaling provided in this embodiment, for a short message of which a parameter value of a validity period of the short message is 0, after it is determined that the short message fails to be transmitted, the second device skips adding an identifier of an SMS-SC to MWD of a user, and subsequently, the second device also does not need to instruct the SMS-SC to retransmit the short message to a UE. Therefore, signaling from the second device to the SMS-SC is reduced, and resource overheads for managing records in MWD in the system are saved.

Figure 11:
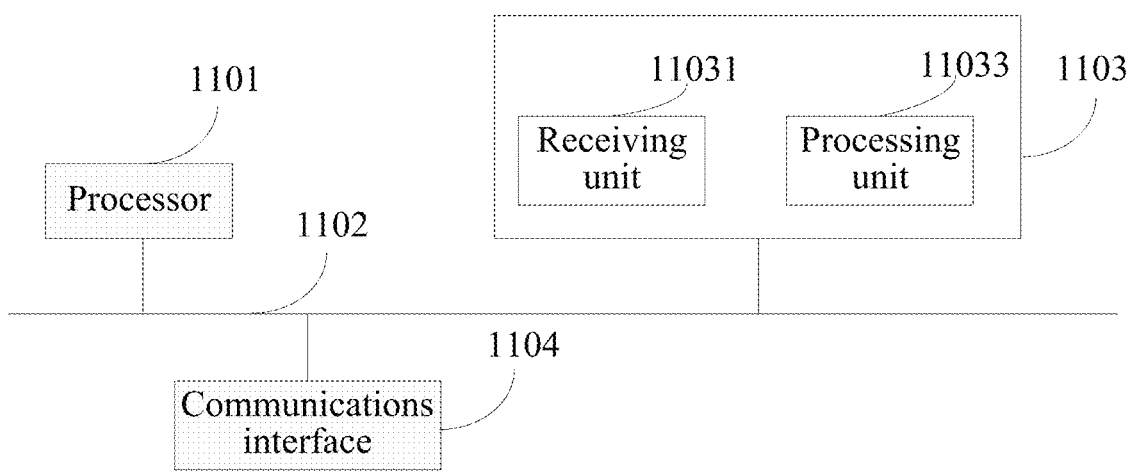
FIG. 11 is a structural diagram of another device for optimizing short message signaling according to an embodiment of the present invention.

FIG. 11 is a structural diagram of another device for optimizing short message signaling according to an embodiment of the present invention, which uses a structure of a universal computer system, where the computer system may specifically be a computer based on a processor. As shown in FIG. 11, the user equipment includes at least one processor 1101, a communications bus 1102, a memory 1103, and at least one communications interface 1104.

The processor may be a universal central processing unit (CPU), a microprocessor, an application-specific integrated circuit (application-specific integrated circuit, ASIC), or one or more integrated circuits configured to control execution of programs in solutions of the present invention.

The communications bus 1102 may include a path on which information is transmitted among the components. The communications interface 1104 uses any apparatus like a transceiver, and is configured to communicate with another device or a communications network, such as an Ethernet, a radio access network (RAN), or a wireless local area network (WLAN).

The computer system further includes one or more memories which may be a read-only memory (read-only memory, ROM) or a static storage device of another type which can store static information and instructions, a random access memory (random access memory, RAM) or a dynamic storage device of another type which can store information and instructions, or may also be an electrically erasable programmable read-only memory (Electrically Erasable Programmable Read-Only Memory, EEPROM), a compact disc read-only memory (Compact Disc Read-Only Memory, CD-ROM) or other optical disc memories, optical disc memories (including a compact disc, a laser disc, an optical disc, a digital versatile disc, a Blu-ray disc, and the like), a magnetic disk storage medium or other magnetic storage devices, or any other medium which can be used for carrying or storing expected program code in an instruction or data structure form and can be accessed by a computer, but is not limited thereto. These memories are connected to the processor through the bus.

The memory 1103 is configured to store program code implementing solutions of the present invention, and the program code implementing the solutions of the present invention is stored in the memory, and is controlled and implemented by the processor. The program code may specifically include: a receiving unit 11031 and a processing unit 11033; the processor 1101 is configured to execute a unit stored in the memory 1103, and when the foregoing unit is executed by the processor 1101, the following functions are implemented:

the receiving unit 11031 is configured to receive a message sent by a network device, where the message carries a parameter indicating a validity period of a short message sent to a user or indication information indicating whether a record needs to be added to MWD of a user when a short message cannot be transmitted or fails to be transmitted; and the processing unit 11033 is configured to: when it is determined that the short message cannot be transmitted or fails to be transmitted, and if a value of the parameter is 0 or the indication information indicates that the record does not need to be added to the MWD of the user when the short message cannot be transmitted or fails to be transmitted, skip adding the record to the short message waiting data MWD of the user, where the record includes an identifier of a service center for short message service serving the user.

Optionally, the processing unit 11033 is further configured to: when there is no available serving node for providing the short message for the user, determine that the short message cannot be transmitted.

Optionally, the processing unit 11033 is further configured to: when a short message fails to be transmitted because a user equipment is unreachable or a user equipment has no available storage space, determine that the short message fails to be transmitted.

Optionally, the network device may be a gateway mobile switching center for short message service, and the message is a short message routing request message or a short message transmission report message.

Optionally, the device for optimizing short message signaling may be an HLR, or may also be an HSS, and is certainly not limited thereto.

For processing in the device for optimizing short message signaling, and interaction with another device, reference may be made to description in the method embodiments, which are not described herein again.

According to the device for optimizing short message signaling provided in this embodiment, for a short message of which a parameter value of a validity period of the short message is 0, after it is determined that the short message fails to be transmitted, the device for optimizing short message signaling skips adding an identifier of an SMS-SC to MWD of a user, and subsequently, the device for optimizing short message signaling also does not need to instruct the SMS-SC to retransmit the short message to a UE. Therefore, signaling from the device for optimizing short message signaling to the SMS-SC is reduced, and resource overheads for managing records in MWD in the system are saved.

It should be noted that each embodiment in the specification is described in a progressive manner. The same or similar parts in the embodiments are just references to each other. Every embodiment illustrates in emphasis what is different from the other embodiments. In particular, for the device embodiment, since it is basically similar to the method embodiment, the device embodiment is described simply, and the execution of specific functions for all units may be obtained with reference to the part of the description of the method embodiment. The preceding embodiments about the device are only exemplary. The units that are described as separate components can be physically separated or not physically separated, and the components displayed as units can be physical units or not physical units. That is, the units or components can be located at one place or scattered on several network units. A part or all of the modules may be selected according to actual needs to achieve the objectives of the solutions of the embodiments. A person of ordinary skill in the art can understand and implement the foregoing embodiments without creative efforts.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for optimizing short message signaling, the method comprising:
    sending, by a first device, a message to a second device, wherein the message carries an indication information indicating whether a record needs to be added to short message waiting data (MWD) of a user when a short message fails to be transmitted, wherein the message is a short message transmission report message;
    receiving, by the second device, the message sent by the first device;
    determining, by the second device, that the short message fails to be transmitted according to the short message transmission report message;
    determining, by the second device, the indication information indicates that the record does not need to be added to the MWD of the user when the short message fails to be transmitted; and
    skipping, by the second device, adding an identifier of a service center for short message service serving the user to the MWD of the user.

2. The method according to claim 1, wherein the identifier of the service center for short message service comprises: a number of the service center for short message service or an address of the service center for short message service.

3. The method according to claim 1, wherein the first device comprises: a gateway mobile switching center for short message service or a service center for short message service.

4. The method according to claim 1, wherein the second device comprises: a Home Location Register (HLR) or a Home Subscriber Server (HSS).

5. The method according to claim 1, wherein the short message transmission report message indicates the short message failed to be transmitted because the user was unreachable or a user equipment has no available storage space.

6. The method according to claim 1, further comprising:
receiving, by the first device, the short message transmission report message from a serving node device for providing the short message service for the user.

7. The method according to claim 6, wherein the serving node device comprises: a mobile switch center (MSC), a visit location register (VLR), a serving GPRS support node (SGSN) device or a mobility management entity (MME) device.

8. The method according to claim 6, wherein before receiving the short message transmission report message from the serving node device, the method further comprises:
sending, by the first device, the short message to the serving node device;
sending, by the serving node device, the short message to the user.

9. The method according to claim 1, wherein the short message comprises: a device triggering message or a user information acquisition message.

10. A system for optimizing short message signaling, the system comprising:
a first device configured to send a message to a second device, wherein the message carries an indication information indicating whether a record needs to be added to short message waiting data (MWD) of a user when a short message fails to be transmitted, wherein the message is a short message transmission report message; and
the second device configured to:
receive the message sent by the first device,
determine that the short message fails to be transmitted according to the short message transmission report message,
determine the indication information indicates that the record does not need to be added to the MWD of the user when the short message fails to be transmitted, and
skip adding an identifier of a service center for short message service serving the user to the MWD of the user.

11. The system according to claim 10, wherein the identifier of the service center for short message service comprises: a number of the service center for short message service or an address of the service center for short message service.

12. The system according to claim 10, wherein the first device comprises: a gateway mobile switching center for short message service or a service center for short message service.

13. The system according to claim 10, wherein the second device comprises: a Home Location Register (HLR) or a Home Subscriber Server (HSS).

14. The system according to claim 10, wherein the short message transmission report message indicates the short message failed to be transmitted because the user was unreachable or a user equipment has no available storage space.

15. The system according to claim 10, further comprising:
a serving node device for providing the short message service for the user; and
wherein the first device is further configured to:
receive the short message transmission report message from the serving node device.

16. The system according to claim 15, wherein the serving node device comprises: a mobile switch center (MSC), a visit location register (VLR), a serving GPRS support node (SGSN) device or an mobility management entity (MME) device.

17. The system according to claim 15, wherein:
the first device is further configured to send the short message to the serving node device before receiving the short message transmission report message from the serving node device; and
the serving node device is further configured to send the short message to the user.

18. The system according to claim 10, wherein the short message comprises a device triggering message or a user information acquisition message.

19. A device for optimizing short message signaling, the device comprising:
at least one processor; and
memory comprising program code which, when executed by the processor, cause the device to:
receive a message sent by a network device, wherein the message carries an indication information indicating whether a record needs to be added to short message waiting data (MWD) of a user when a short message fails to be transmitted, wherein message is a short message transmission report message,
determine that the short message fails to be transmitted according to the short message transmission report message,
determine the indication information indicates that the record does not need to be added to the MWD of the user when the short message fails to be transmitted, and
skip adding an identifier of a service center for short message service serving the user to the MWD of the user.

20. The device according to claim 19, wherein the device comprises: a Home Location Register (HLR) or a Home Subscriber Server (HSS).

* * * * *